US010929989B2

United States Patent
Kurzendorfer et al.

(10) Patent No.: US 10,929,989 B2
(45) Date of Patent: Feb. 23, 2021

(54) DETERMINING A TRANSFORMATION BETWEEN COORDINATE FRAMES OF SETS OF IMAGE DATA

(71) Applicant: Siemens Healthcare GmbH, Erlangen (DE)

(72) Inventors: Tanja Kurzendorfer, Trautmannshofen (DE); Rui Liao, Princeton Junction, NJ (US); Tommaso Mansi, Plainsboro, NJ (US); Shun Miao, Princeton, NJ (US); Peter Mountney, London (GB); Daniel Toth, Twickenham (GB)

(73) Assignee: Siemens Healthcare GmbH, Erlangen (DE)

( * ) Notice: Subject to any disclaimer, the term of this patent is extended or adjusted under 35 U.S.C. 154(b) by 170 days.

(21) Appl. No.: 16/173,853

(22) Filed: Oct. 29, 2018

(65) Prior Publication Data
US 2019/0130587 A1     May 2, 2019

(30) Foreign Application Priority Data

Nov. 1, 2017    (GB) ...................................... 1718078
Apr. 27, 2018  (EP) .................................... 18169912

(51) Int. Cl.
*G06T 7/00*        (2017.01)
*G06T 7/33*        (2017.01)
(Continued)

(52) U.S. Cl.
CPC ............ *G06T 7/344* (2017.01); *G06T 3/0068* (2013.01); *G06T 7/30* (2017.01);
(Continued)

(58) Field of Classification Search
CPC ......... G06T 7/344; G06T 7/30; G06T 3/0068; G06T 2207/10081; G06T 2207/10088;
(Continued)

(56) References Cited

U.S. PATENT DOCUMENTS 9,569,736 B1 *   2/2017   Ghesu .................. G06K 9/6267
2011/0282473 A1 * 11/2011   Pavlovskaia ............ G06F 19/00
                                                                                      700/98

(Continued)

FOREIGN PATENT DOCUMENTS

EP         3121789 A1    1/2017
EP         3246875 A2   11/2017

OTHER PUBLICATIONS

Bourier, Felix, et al. "Coronary sinus extraction for multimodality registration to guide transseptal puncture." pp. 1-4, (2010).

(Continued)

*Primary Examiner* — Michael R Neff
(74) *Attorney, Agent, or Firm* — Lempia Summerfield Katz LLC

(57) ABSTRACT

The disclosure relates to a method of determining a transformation between coordinate frames of sets of image data. The method includes receiving a model of a structure extracted from first source image data, the first source image data being generated according to a first imaging modality and having a first data format, wherein the model has a second data format, different from the first data format. The method also includes determining, using an intelligent agent, a transformation between coordinate frames of the model and first target image data, the first target image data being generated according to a second imaging modality different to the first imaging modality.

15 Claims, 7 Drawing Sheets

(51) Int. Cl.
 G06T 3/00 (2006.01)
 G06T 7/30 (2017.01)
(52) U.S. Cl.
 CPC ............... *G06T 2207/10081* (2013.01); *G06T 2207/10088* (2013.01); *G06T 2207/10116* (2013.01); *G06T 2207/10132* (2013.01); *G06T 2207/20081* (2013.01)
(58) Field of Classification Search
 CPC . G06T 2207/10116; G06T 2207/10132; G06T 2207/20081
 USPC ......................................................... 382/131
 See application file for complete search history.

(56) References Cited

U.S. PATENT DOCUMENTS

2017/0024634 A1  1/2017  Miao et al.
2017/0217102 A1  8/2017  Mansi et al.
2017/0337682 A1  11/2017  Liao et al.

OTHER PUBLICATIONS

Choi, Jinwoo, et al. "X-ray and magnetic resonance imaging fusion for cardiac resynchronization therapy" Medical image analysis 31, pp. 98-107, (2016).

De Silva, Ranil, et al. "X-ray fused with magnetic resonance imaging (XFM) to target endomyocardial injections: validation in a swine model of myocardial infarction." Circulation 114.22, pp. 2342-2350, (2006).

European Office Action for European Patent Application No. 18169912.5-1210 dated Aug. 9, 2018.

Faber, Tracy L., et al. "Three-dimensional fusion of coronary arteries with myocardial perfusion distributions: clinical validation." Journal of Nuclear Medicine 45.5, pp. 745-753, (2004).

Kaiser, Markus, et al. "Significant acceleration of 2d-3d registration-based fusion of ultrasound and x-ray images by mesh-based drr rendering." Medical Imaging 2013: Image-Guided Procedures, Robotic Interventions, and Modeling. vol. 8671. International Society for Optics and Photonics, pp. 1-5, (2013).

Krebs, Julian, et al. "Robust non-rigid registration through agent-based action learning." International Conference on Medical Image Computing and Computer-Assisted Intervention. Springer, Cham, pp. 334-352, (2017).

Kruger, J. et al: "Acceleration Techniques for Gpu-Based vol. Rendering" Proceedings. Seattle, WA, Oct. 19-24, 2003; [annual ieee conference on Visualization], New York, Ny: IEEE, US, pp. 287-292 (2003).

Liao, Rui et al.: "An Artificial Agent for Robust Image Registration"; in: AAAI Conference; pp. 4168-4175 (2017).

Ma, YingLiang, et al. "MRI to X-ray fluoroscopy overlay for guidance of cardiac resynchronization therapy procedures." Computing in Cardiology, 2010. IEEE, pp. 229-232, (2010).

Miao, Shun, et al. "Dilated FCN for multi-agent 2D/3D medical image registration." arXiv preprint arXiv:1712.01651, pp. 1-8, (2017).

Miao, Shun, et al. "Real-time 2D/3D registration via CNN regression." Biomedical Imaging (ISBI), 2016 IEEE 13th International Symposium on. IEEE, pp. 1-5, (Apr. 25, 2016).

Mountney, Peter, et al. "A planning and guidance platform for cardiac resynchronization therapy." IEEE transactions on medical imaging 36.11, pp. 2366-2375 (2017).

Rhode, Kawal S., et al. "Registration and tracking to integrate X-ray and MR images in an XMR facility." IEEE transactions on medical imaging 22.11, pp. 1369-1378, (2003).

Toth, Daniel, et al. "3D/2D Registration with superabundant vessel reconstruction for cardiac resynchronization therapy." Medical image analysis 42, pp. 160-172, (2017).

Toth, Daniel, et al. "Registration with adjacent anatomical structures for cardiac resynchronization therapy guidance." International Workshop on Statistical Atlases and Computational Models of the Heart. Springer, Cham, pp. 1-9, (2016).

Truong, M.V.N., et al. "2D-3D registration of cardiac images using catheter constraints." Computers in Cardiology, pp. 605-608, (2009).

Truong, Michael VN, et al. "Preliminary investigation: 2D-3D registration of MR and X-ray cardiac images using catheter constraints." CI2BM09-MICCAI Workshop on Cardiovascular Interventional Imaging and Biophysical Modelling, pp. 1-10, (Sep. 2009).

Zheng, Yefeng, et al. "Four-chamber heart modeling and automatic segmentation for 3-D cardiac CT volumes using marginal space learning and steerable features." IEEE transactions on medical imaging 27.11, pp. 1-14, (2008).

Zhou, Weihua, et al. "3D fusion of LV venous anatomy on fluoroscopy venograms with epicardial surface on SPECT myocardial perfusion images for guiding CRT LV lead placement." JACC: Cardiovascular Imaging 7.12, pp. 1239-1248 (2014).

\* cited by examiner

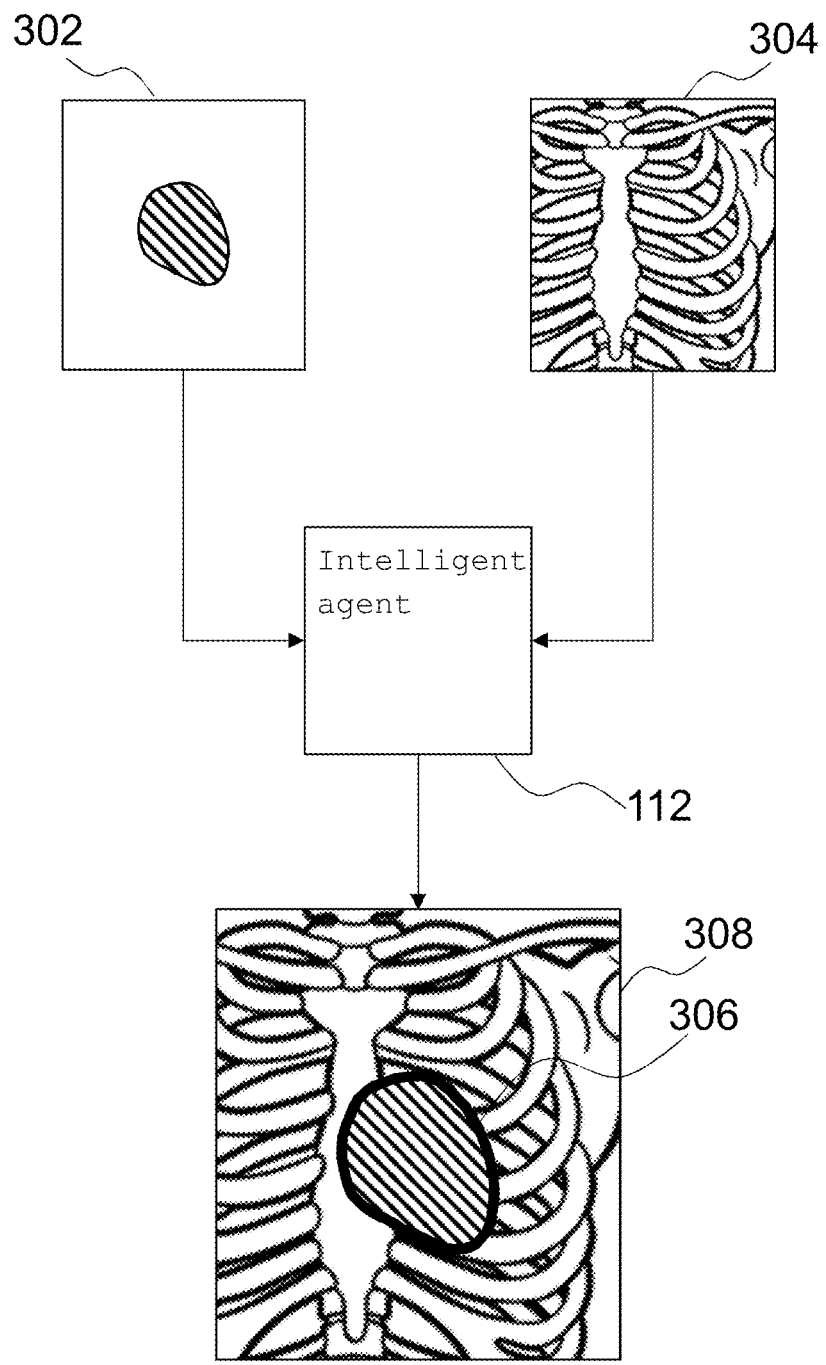

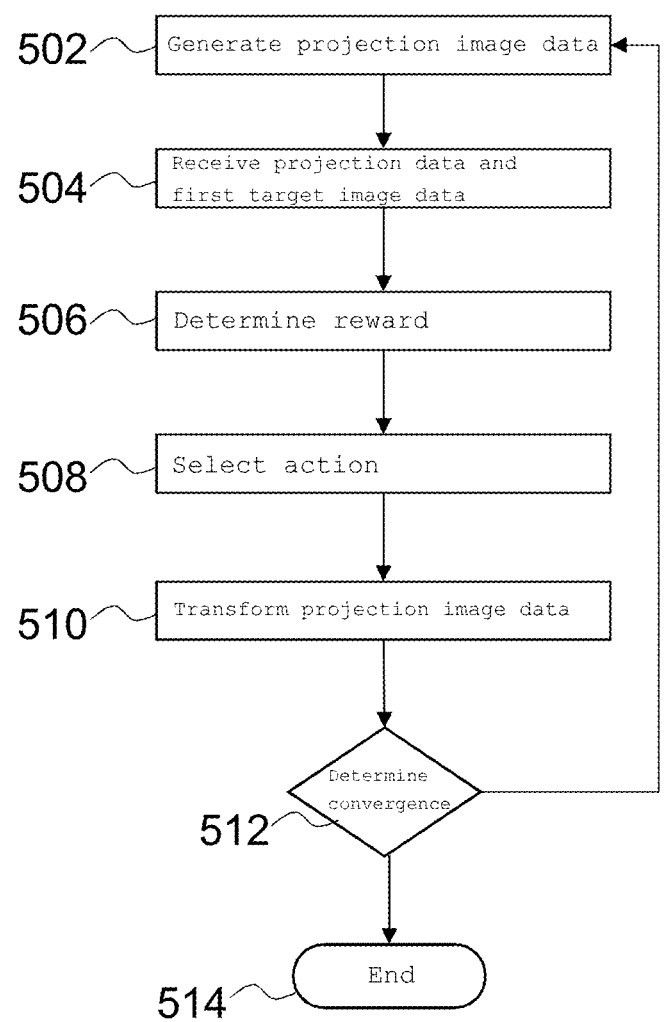

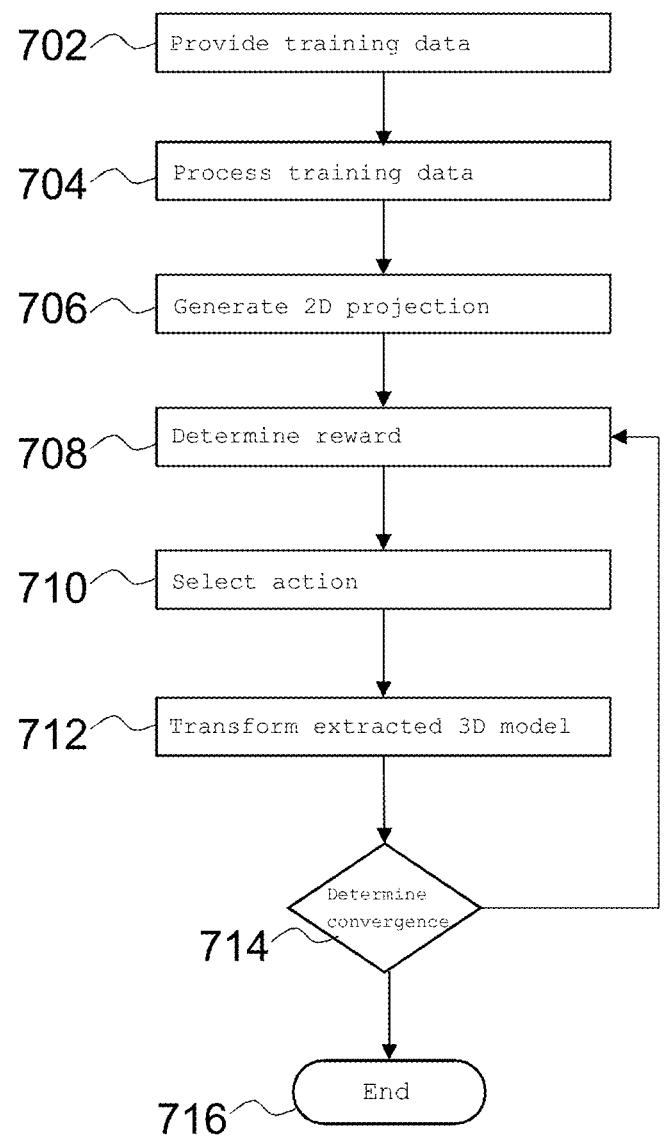

DETERMINING A TRANSFORMATION BETWEEN COORDINATE FRAMES OF SETS OF IMAGE DATA

The application claims the benefit of Great Britain Patent Application No. GB 1718078.7, filed Nov. 1, 2017, and European Patent Application No. EP 18169912.5, filed Apr. 27, 2018, which are hereby incorporated by reference in their entireties.

TECHNICAL FIELD

The disclosure relates in one aspect to a method for determining a transformation between coordinate frames of sets of image data. In further aspects, the disclosure relates to a medical imaging device and a computer program product.

BACKGROUND

For medical applications that involve preoperative planning and intraoperative guidance, there may be a benefit in being able to determine a transformation between a coordinate frame of an image acquired preoperatively and a coordinate frame of an image take intraoperatively. Such a determination of a transformation may be referred to as registration.

Registration between images acquired using different imaging modalities pose particular challenges because structures observable in an image acquired using one modality may not be observable, or may appear somewhat differently, in an image acquired using a different modality. Intensity values, contrast levels, resolution, and field of view may be significantly different between different imaging modalities and, in some cases, the same structures may not be visible in both modalities. For example, soft tissue structures that are observable in a magnetic resonance image may not easily be observable in an X-ray fluoroscopy image. Finding a transformation between two image datasets that were acquired using fundamentally different imaging modalities may therefore be challenging.

This problem is compounded if the scale of the images are not the same. For example, preoperative data acquisition protocols may be designed for diagnostic purposes and are not optimized for being registered with images acquired using a different imaging modality. Consequently, images acquired for preoperative diagnostic purposes may have a different field of view and resolution to images that are used intraoperatively.

An example of an application which uses both preoperative and intraoperative images is a minimally invasive cardiac intervention, such as cardiac resynchronization therapy. In such a procedure, differences between preoperative and intraoperative image data may be significant. The preoperative data may be acquired using a magnetic resonance imaging technique and the intraoperative data is acquired using a two-dimensional X-ray fluoroscopy technique. The preoperative magnetic resonance acquisition may include a stack of images each showing the soft tissue anatomy with high in-plane resolution but low out-of-plane resolution. Each of the stack of magnetic resonance images may have a relatively small field of view in order to concentrate on the anatomy of interest (for example, the ventricles of the heart), showing only a few surrounding structures. Accordingly, structures that may otherwise be useful for registration (such as the spine or the ribs) may not be visible in the magnetic resonance data. In contrast, X-ray fluoroscopy performed intraoperatively may have a wider field of view and show dense structure, such as bones or instruments, but may not show the soft tissue anatomy clearly.

Registration of preoperative magnetic resonance images to intraoperative X-ray for cardiac resynchronization therapy, for example, may be performed manually. In order to address the problem that there are few structures common to images acquired using each modality (e.g., that cross-modality information is highly limited), fiducial markers may be used. However, use of fiducial markers for registration requires the preoperative imaging to be performed immediately before the procedure (and the corresponding intraoperative imaging), to provide that the fiducial markers are consistent between imaging modalities. This may require a change in clinical procedures and may also require additional imaging hardware in the operating room.

Artificial intelligence based approaches have been used to perform registration between different sets of image data acquired using different imaging modalities. However, there are a number of challenges in achieving accurate and robust registration between imaging modalities. Firstly, large sets of training data with ground truth information is needed in order to train a system to accurately and robustly perform registration. Such data is difficult to obtain for certain combinations of imaging modalities. Secondly, once a system has been trained to accurately and robustly perform registration between two imaging modalities, that training cannot be transferred to other combinations of imaging modalities. That is, the system will only work on the specific modalities and acquisition protocols it was trained on.

SUMMARY

The scope of the present disclosure is defined solely by the appended claims and is not affected to any degree by the statements within this description. The present embodiments may obviate one or more of the drawbacks or limitations in the related art.

Methods, medical imaging devices, and computer program products are disclosed herein to solve the problems discussed above.

The disclosure relates in one aspect to a method of determining a transformation between coordinate frames of sets of image data. The method includes receiving a model of a structure extracted from first source image data, the first source image data being generated according to a first imaging modality and having a first data format, wherein the model has a second data format, different from the first data format. The method also includes determining, using an intelligent agent, a transformation between coordinate frames of the model and first target image data, the first target image data being generated according to a second imaging modality different to the first imaging modality.

One embodiment relates in one aspect to a method including: receiving a further model of a structure extracted from second source image data, the second source image data being generated according to a third imaging modality, different to the first modality, and having a third data format different to the first data format, wherein the further model has the second data format; and determining, using the intelligent agent, a transformation between coordinate frames of the further model and second target image data, the second target image data being generated according to a fourth imaging modality different to the first imaging modality.

One embodiment relates in one aspect to a method including segmenting the first source image data to extract the model.

One embodiment relates in one aspect to a method including generating a polygon mesh based on the segmented first source image data.

One embodiment relates in one aspect to a method wherein the first source image data includes three-dimensional image data and the first target image data includes two-dimensional image data.

One embodiment relates in one aspect to a method including: generating projection image data based on a two-dimensional projection of the model; receiving, at the intelligent agent, the projection image data and the first target image data; determining, by the intelligent agent, a reward for each of a plurality of actions applicable to the projection image data; selecting an action based on the determined rewards; and transforming the projection image data according to the selected action.

One embodiment relates in one aspect to a method including: applying the selected action to the model to generate a transformed model; and generating further projection image data based on a two-dimensional projection of the transformed model.

One embodiment relates in one aspect to a method wherein the reward for each of the plurality of actions is determined based on a translation and/or a rotation of the projection image data.

One embodiment relates in one aspect to a method including: specifying imaging geometry associated with the first target image data; and generating the projection image data in accordance with the specified imaging geometry.

One embodiment relates in one aspect to a method wherein the first source image data includes one of: magnetic resonance image data, computed tomography image data, and ultrasound image data and/or the first target image data includes X-ray image data.

One embodiment relates in one aspect to a method including performing a training process to train the intelligent agent, the training process including: providing training data to the intelligent agent, the training data including three-dimensional image data; processing the training data to extract a three-dimensional model of a structure from the training data and to generate digitally reconstructed two-dimensional image data; generating a two-dimensional projection of the extracted three-dimensional model; determining, by the intelligent agent, a reward for each of a plurality of actions applicable to the two-dimensional projection; selecting an action based on the determined rewards; and transforming the extracted three-dimensional model according to the selected action.

One embodiment relates in one aspect to a method wherein the two-dimensional projection has a field of view that is smaller than a field of view of the digitally reconstructed two-dimensional image data.

One embodiment relates in one aspect to a method wherein the training data includes computed tomography image data.

The disclosure relates in one aspect to a medical imaging device. The device includes a processor configured to: receive a model of a structure extracted from first source image data, the first source image data being generated according to a first imaging modality and having a first data format, wherein the model has a second data format, different to the first data format; and determine, using an intelligent agent, a transformation between coordinate frames of the model and first target image data, the first target image data being generated according to a second imaging modality different to the first imaging modality.

One embodiment relates in one aspect to a medical imaging device includes a display unit, wherein the processor is configured to: generate an overlay based on the transformation between coordinate frames of the model and the first target image data; apply the overlay to the target image data to generate an annotated image; and display the annotated image on the display unit.

The disclosure relates in one aspect to a computer program, wherein the computer program is loadable into a memory unit of a data processing system, including program code sections to make a data processing system execute the method according to an aspect when the computer program is executed in the data processing system.

The computer program product may be, for example, a computer program or include another element apart from the computer program. This other element may be hardware, for example a memory device, on which the computer program is stored, a hardware key for using the computer program and the like, and/or software, for example a documentation or a software key for using the computer program.

The medical imaging device may include an X-ray fluoroscopy device, a computed tomography device, a magnetic resonance imaging device, a molecular imaging device, a SPECT-device, a PET-device, or a combination thereof. The medical imaging device may be, for example, a combination of an imaging modality and a therapy modality, such as a radiation therapy modality.

Reference is made to the fact that the described methods and the described imaging device are example embodiments of the disclosure and that the disclosure may be varied by a person skilled in the art, without departing from the scope of the disclosure provided it is specified by the claims.

BRIEF DESCRIPTION OF THE DRAWINGS

The disclosure will be illustrated below with reference to the accompanying figures using example embodiments. The illustration in the figures is schematic and simplified and not necessarily to scale.

FIG. 3 is a simplified diagram illustrating an example of a processing system for determining a transformation between coordinate frames of sets of image data.

FIG. 5 is a simplified workflow diagram illustrating a method according to one aspect.

FIG. 7 is a simplified workflow diagram illustrating an example of a training process to train an intelligent agent to determine a transformation between coordinate frames of sets of image data.

DETAILED DESCRIPTION

Figure 1:
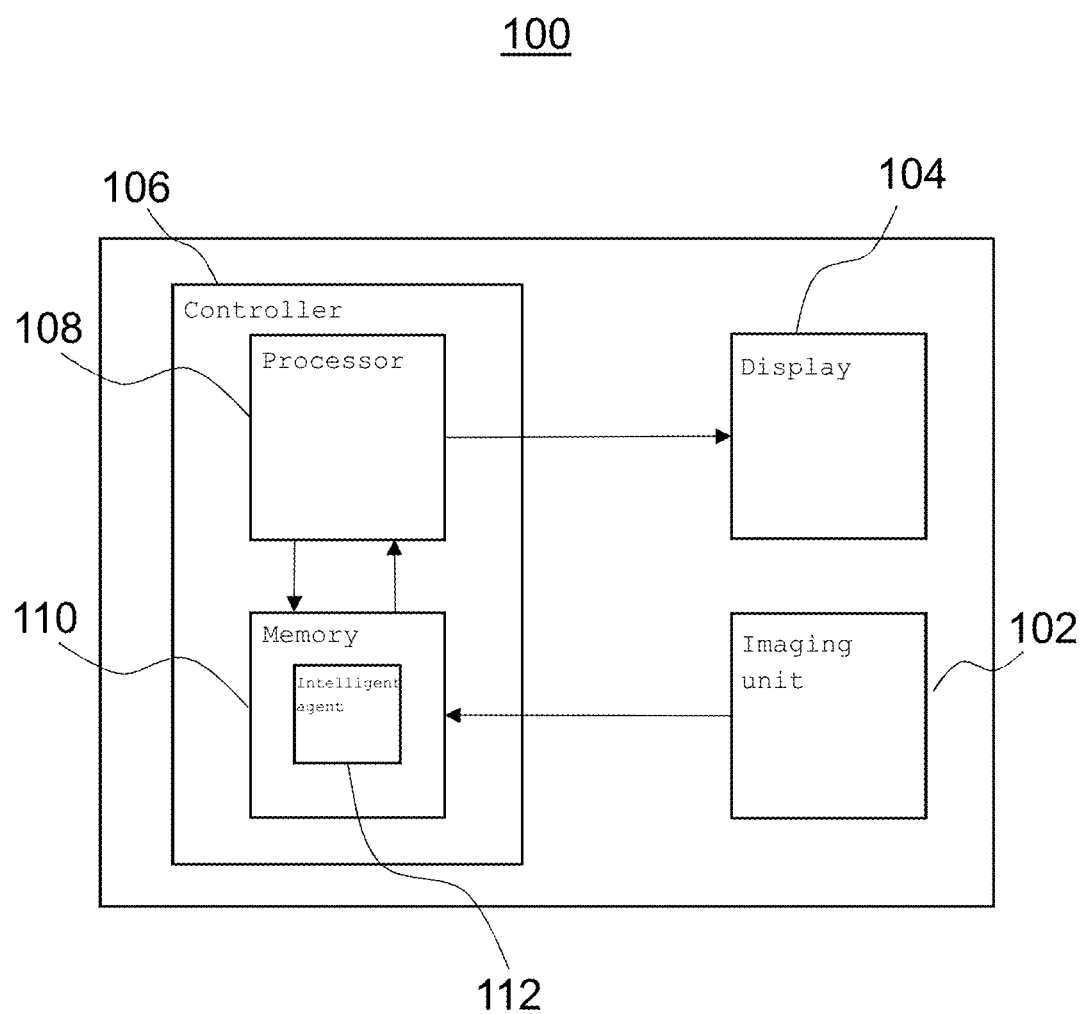
FIG. 1 is a schematic diagram of an imaging device according to one aspect.

FIG. 1 is a diagram illustrating an imaging device 100 according to an embodiment. The imaging device 100 includes an imaging unit 102 arranged to generate image data according to a particular imaging modality. For example, the imaging unit 102 may be an X-ray fluoroscopy unit arranged to generate X-ray fluoroscopy images and present them on a display 104.

The imaging device 100 may include a controller 106 for controlling one or more parameters of the imaging device 100. For example, the controller 106 may control images presented on the display 104 and may be arranged to generate display data, based on image data generated by the imaging unit 102, for controlling display parameters of the display 104.

The controller 106 may be implemented using hardware and/or software. In some examples, the controller 106 may include a processor 108 programmed to perform the functions of the controller 106.

The controller 106 may include a memory 110 arranged to store data in the form of an intelligent agent 112 that is trained by implementing a machine learning algorithm prior to installation and use of the imaging device 100 in an operation setting. For example, the intelligent agent 112 may be trained by supplying training data to the intelligent agent 112 and the machine learning algorithm may learn to determine transformations between different sets of image data.

The machine learning algorithm may be any suitable algorithm implementing an artificial neural network for extracting a model of a structure from image data. For example, the machine learning algorithm may be a convolutional neural network (CNN) algorithm, which enables the intelligent agent 112 to be trained to determine transformations between coordinate frames of sets of image data. In another example, the machine learning algorithm may be a fully convolutional neural network (FCN) algorithm. In another example, the machine learning algorithm may be a multilayer perceptron (MLP) algorithm.

Furthermore, the memory 110 may store a computer program executable by the processor 108, to perform the methods described herein, and specifically the methods described below with reference to FIGS. 2, 5 and 7.

The memory 110, may be any suitable form of memory. For example, the memory 110 may include volatile memory, such as random access memory (RAM) and/or non-volatile memory such as read only memory (ROM) or flash memory. Furthermore, the memory 110 may include multiple, separate, memory devices and may include a combination of volatile and non-volatile memory. In some examples, certain components, (such as the computer program and/or the model), may be stored in one memory device, while other components may be stored in another memory device.

Figure 2:
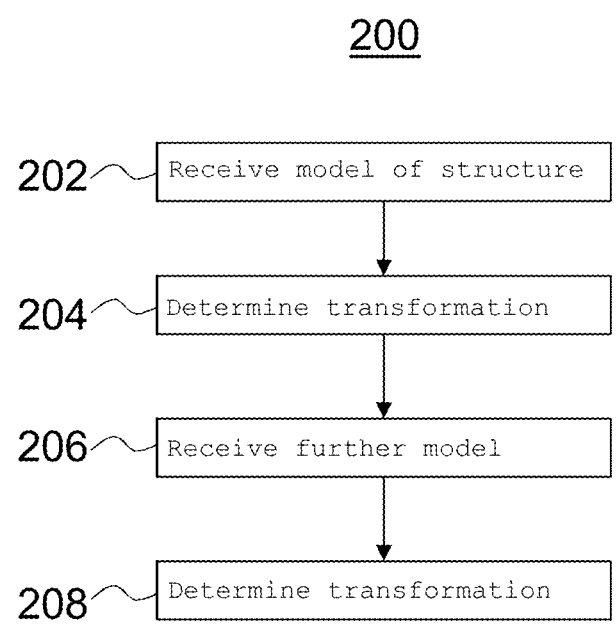
FIG. 2 is a simplified workflow diagram illustrating a method according to one aspect.

FIG. 2 is a flow diagram depicting a method 200 of determining a transformation between coordinate frames of sets of image data. The method 200 may, for example, be implemented by software or firmware executed by the controller 106 using the intelligent agent 112 described above with reference to FIG. 1.

At block 202, the intelligent agent 112 receives a model of a structure extracted from first source image data.

The first source image data is generated according to a first imaging modality having a first data format. For example, the first source image data may be generated by a magnetic resonance imaging technique and have a data format appropriate for storing and handling magnetic resonance images. In particular, the first source image data may be three-dimensional image data. In other examples, the first source image data may be generated by a computer tomography imaging technique or an ultrasound imaging technique. The model has a second data format, different from the first data format. In particular, the model may be generated with the same format irrespective of the imaging modality with which the first source image data is generated or the format of the first source image data.

At block 204, the intelligent agent 112 determines a transformation between coordinate frames of the model and first target image data.

The first target image data is generated according to a second imaging modality different to the first imaging modality. The first target image data may include two-dimensional image data. For example, the first target image data may be generated using an X-ray fluoroscopy technique and have a data format appropriate for displaying X-ray fluoroscopy images on a display.

In the method 200 described with reference to FIG. 2, a transformation is determined between coordinate frames of a model extracted from the first source image data and the first target image data, instead of a transformation between coordinate frames of the first source image data itself and the first target image data. This enables the method 200 to be indifferent to the modality with which the first source image data is acquired or the format of the first source image data, because the format of the model is independent of the imaging modality used to generate the first source image data.

The only requirement on the first source image data is that a structure of interest (such as an anatomical structure) may be segmented to extract the model. A transformation between coordinate frames of the model and the first target image data may then be determined using the method 200 applied by an intelligent agent 112.

In relation to medical applications, this means that the method 200 is indifferent to the modality by which preoperative image data is acquired. Regardless of the modality by which the preoperative data is acquired, a transformation between coordinate frames of the model and the first target image data (e.g., the registration result) may be used to guide interventional procedures. In particular, the result of the registration may be used, for example, to guide medical procedures where only the first target image data is available in real time during the procedure, but where the real time image data is acquired using an imaging modality that does not show the anatomy of interest for the procedure.

This is performed in blocks 206 and 208 of FIG. 2.

At block 206, the intelligent agent 112 receives a further model of a structure extracted from second source image data.

The second source image data is generated according to a third imaging modality, different to the first modality, and has a third data format different to the first data format. For example, the second source image data may be generated by an ultrasound technique and have a data format appropriate for storing and handling ultrasound images.

The further model has the second data format. In other words, despite the second source image data being generated according to a different imaging modality to the first source image data, the model extracted from the second source image data has the same format and the model extracted from the first source image data.

At block 208, the intelligent agent 112 determines a transformation between coordinate frames of the further model and second target image data.

The second target image data is generated according to a fourth imaging modality different to the first imaging modality. In some examples, the fourth imaging modality may be the same as the second imaging modality. In other examples, the fourth imaging modality may be different to the second imaging modality. For example, the first target image data and the second target image data may both be generated using an X-ray fluoroscopy technique and have a data format appropriate for displaying X-ray fluoroscopy images on a display.

FIG. 3 is a schematic diagram of a processing system 300 for determining a transformation between coordinate frames of sets of image data in accordance with the method 200 described above with reference to FIG. 2. The processing system 300 includes an intelligent agent such as the intelligent agent 112 described above with reference to FIG. 1. The intelligent agent 112 is trained to determine transformations between sets of image data.

The intelligent agent 112 is arranged to receive a model 302 of a structure extracted from source image data. As shown in FIG. 3, the model 302 may be in the form of a two-dimensional projection of a three-dimensional model extracted from source image data generated according to a first imaging modality. In some examples, the first imaging modality may be one of: magnetic resonance imaging, computed tomography imaging, and ultrasound imaging.

The intelligent agent 112 is also arranged to receive target image data 304 generated according to a second imaging modality. For example, the intelligent agent 112 may receive imaging data generated from the imaging unit 102 described above with reference to FIG. 1, which may be an X-ray fluoroscopy imaging unit, for example.

The intelligent agent 112 is arranged to determine a transformation between coordinate frames of the model 302 and the target image data 304 using the method 200 described above with reference to FIG. 2. Based on the determined transformation, the intelligent agent 112 may generate an overlay 306 and apply the overlay 306 to the target image data 304 to generate an annotated image 308 for display on a display unit, such as the display unit 104 described above with reference to FIG. 1. For example, the display unit 104 may display a real time X-ray fluoroscopy image with an overlay 306 corresponding to the structure extracted from the source image data, registered to the target image data 304. For example, as shown in FIG. 3, the display unit 104 may display a real time chest X-ray image 308 including an overlay 306 showing the position and orientation of a portion of a heart located within the chest.

Figure 4A:
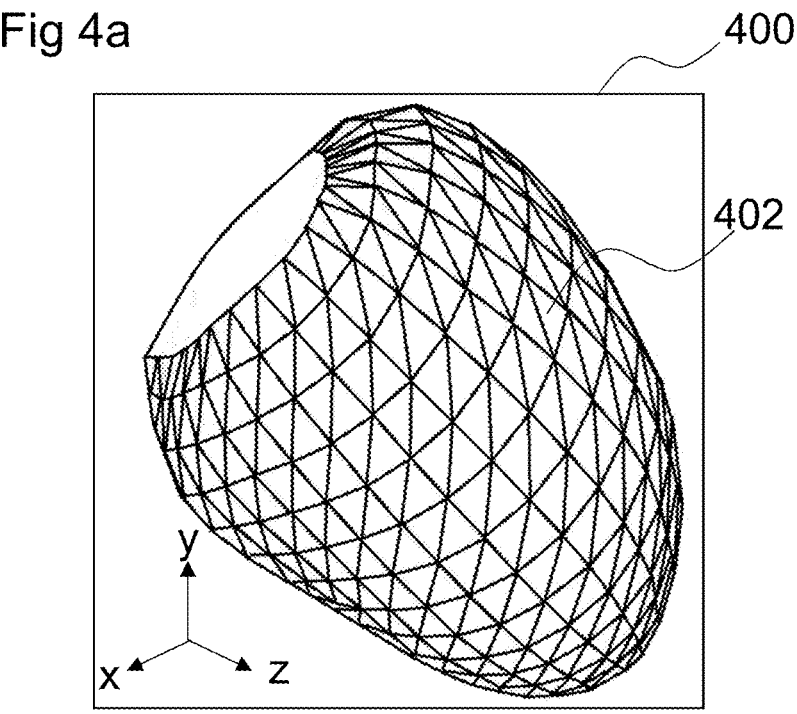
FIG. 4a is a simplified diagram illustrating an example of a three-dimension model of a structure extracted from image data.

FIG. 4a is an image depicting a three-dimensional model 400 extracted from source image data (such as preoperative image data). The three-dimensional model 400 may be, for example, extracted from the source image data by a segmentation process. The three-dimensional model 400 may be a model of an anatomical structure. In the example shown in FIG. 4a, the three-dimensional model 400 is a model of the left ventricle of a human heart.

Segmentation is a process of partitioning a digital image into multiple segments (e.g., sets of pixels) to simplify and/or change the representation of an image into something that is easier to analyze. Segmentation of the source image data is used to locate structures (such as objects and their boundaries) in the source image data. In some examples, source image data may be segmented by a combination of object localization with marginal space learning and a multi-act non-rigid deformation estimation.

The result of image segmentation is a set of segments that collectively cover the entire image. Each of the pixels in a segment are similar with respect to some characteristic and adjacent segments are different with respect to the same characteristic. In some examples, the segments may be defined by annotation. When applied to a stack of images, (e.g., in medical imaging), the resulting contours after image segmentation may be used to create a three-dimensional reconstructed model using, for example, an interpolation algorithm. In some examples, the segments may define a three-dimension mesh model including a set of polygons 402 arranged to define a polygon mesh model of a structure in the source image data.

Such a model 400 is independent of the parameters of the source image data, such as voxel intensities, resolution, field of view and other image acquisition parameters. In other words, the format of the mesh model 400 is independent of the imaging modality with which the source image data is generated. An intelligent agent trained using models generated from one imaging modality may be applied to models extracted from source image data generated using other imaging modalities without retraining the intelligent agent for the specific other modalities. Therefore, using a mesh model 400 with a format that is imaging modality-independent simplifies the training process, because it removes the need to train the intelligent agent for each combination of imaging modalities.

Figure 4B:
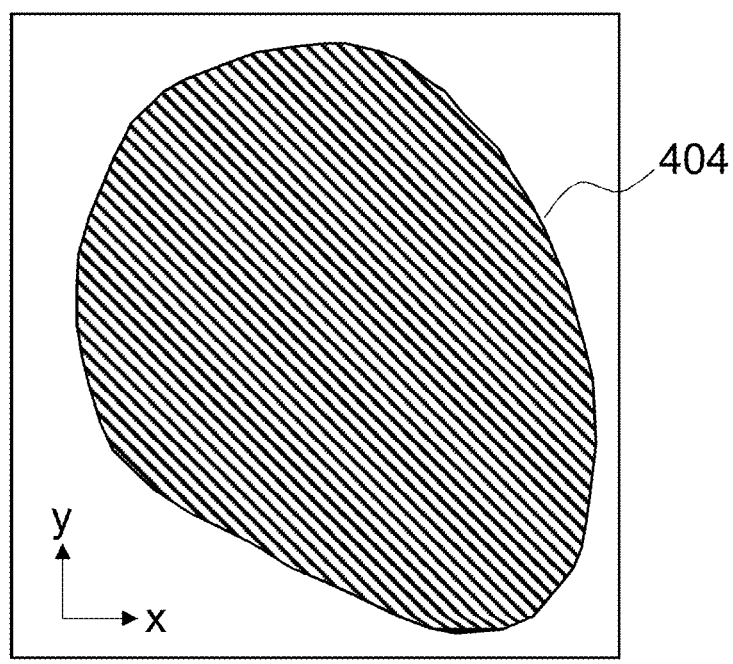
FIG. 4b is a simplified diagram illustrating an example of a two-dimensional projection of a three-dimensional model of a structure extracted from image data.

FIG. 4b is an image depicting an example of a two-dimensional projection 404, or binary mask, of the three-dimensional model 400 shown in FIG. 4a. Similar to the mesh model 400 described above with reference to FIG. 4a, the format of the two-dimensional projection 404 is independent of the imaging modality with which the source image data is generated. To generate projection image data, the intelligent agent 112 may record or specify imaging geometry associated with the first target image data. For example, if the first target image data is acquired using X-ray fluoroscopy, parameters relating to collimator settings, field of view, a position and/or an orientation of the radiation source, and/or a detector type may be recorded or specified. Two-dimensional projection image data may then be generated using the same imaging geometry as that used to acquire the first target image data. This, in turn may improve the efficiency of the registration process.

FIG. 5 is a flow diagram depicting a method 500 of determining a transformation between coordinate frames of sets of image data.

At block 502, projection image data is generated based on a two-dimensional projection of the model. The projection image data (e.g., binary mask) may be generated by the intelligent agent 112 as described above with reference to FIG. 4b, for example.

At block 504, the intelligent agent 112 receives the projection image data and the first target image data. For example, the first target image data may be X-ray fluoroscopy data acquired during an intervention procedure.

The first target image data may be considered to be fixed image data and the projection image data may be considered to be moving image data because, in the process of performing the method 500, the projection image data may be transformed to correspond with the target image data. The projection image data (e.g., the moving image) is generated to have a smaller field of view than that of the target image data (e.g., the fixed image). For example, the target image data may result in an image having a field of view of 300 mm×300 mm whereas the projection image data may result in an image having a field of view of 100 mm×100 mm. Generating the projection image data (e.g., the moving image) to have a smaller field of view than the fixed image provides that the moving image is within the boundaries of the fixed image.

At block 506, the intelligent agent 112 determines a reward for each of a plurality of actions applicable to the projection image data.

For example, the reward for each of the plurality of actions may be determined based on a translation and/or rotation of the projection image data. In some examples, the actions may include translations in each of three orthogonal directions and rotations about axes (x, y, z) defining those directions. In other examples, one or more of the axes may be fixed. For example, in some applications, depth (z axis) may be assumed to be approximately correct if the center of the model and the center of the first target image data are co-registered (e.g., the centers may be assumed to be collocated). In such cases, actions may be restricted to translations along the x and y axes and rotation about the z axis, reducing the number of degrees of freedom by which the intelligent agent 112 determines rewards for actions to three degrees of freedom.

A reward is determined based on the effectiveness of the action. Higher rewards are determined for improvements to an alignment between the two-dimensional projection image data (e.g., of the model) and the two-dimensional target image data. Lower, or negative, rewards are determined for deterioration of alignment between the two-dimensional projection image data (e.g., of the model) and the two-dimensional target image data.

At block 508, an action is selected based on the determined rewards. For example, the intelligent agent 112 may evaluate each of the rewards associated with each of the plurality of actions and determine which action has the highest associated reward. The intelligent agent 112 may thus determine that the action having the highest associated reward is the action most likely to move the model closer to a transformation to the first target image data. In other words, the intelligent agent 112 may determine that the action having the highest associated reward is the most likely to result in a registration with the target image data.

At block 510, the projection image data is transformed according to the selected action. For example, the selected action may be applied to the model to generate a transformed model and further projection image data may be generated based on a two-dimensional projection of the transformed model.

At block 512, the intelligent agent 112 determines whether there is convergence. In other words, the intelligent agent 112 may determine whether a difference between an iteration of the method 500 and a previous iteration (e.g., the change brought about by transforming the model according to the selected action) is below a certain threshold. If the intelligent agent 112 determines that there is not convergence, the method 500 returns to block 502 and projection image data is regenerated based on a two-dimensional projection of a transformed model. If the intelligent agent 112 determines that there is convergence, the intelligent agent 112 moves to block 514 where the method 500 ends.

To train the intelligent agent 112 to enable it to accurately and robustly determine a transformation between coordinate frames of different images (e.g., to perform the registration process), the intelligent agent 112 is provided with training data.

The training data may include three-dimensional models (e.g., representative of the types of models extracted from source image data) that are aligned to two dimensional images representative of the target image data.

Obtaining accurate ground truth registration between magnetic resonance image data or ultrasound data and corresponding X-ray data is challenging. Therefore, to train the intelligent agent 112, computed tomography image data is used. The reason for this is that three-dimensional models and two-dimensional image data may be extracted from the same three-dimensional computed tomography image data set. Because the intelligent agent 112 is trained to determine a transformation between coordinate frames of an imaging modality-independent model and target image data, the intelligent agent 112 may be trained using three-dimensional models and two-dimensional image data extracted from the three-dimensional computed tomography image data set, and then used in an operation setting to determine transformations between a coordinate frame of another model having an imaging modality-independent format and a coordinate frame of target image data generated using other imaging modalities.

The three-dimensional models may be extracted by segmentation, as described above with reference to FIGS. 4a and 4b, to produce a mesh model (e.g., similar to that shown in FIG. 4a) and a binary mask (e.g., similar to that shown in FIG. 4b).

The two-dimensional images are digitally reconstructed radiographs, which are artificial X-ray images generated based on an X-ray attenuation model. The digitally reconstructed radiographs are projections of the three-dimensional computed tomography data onto a two-dimensional plane and represent equivalent X-ray fluoroscopy data. The projections are generated using a ray-casting method. The center of projection is deemed to be the center point of the model (e.g., extracted from the same computed tomography image data).

The registration task performed by the intelligent agent 112 may be formulated as a reinforcement learning problem. Acts performed by the intelligent agent 112 may be modelled as a Markov decision process: $\{S, A, \tau, r, \gamma\}$ where S represents possible states, A represents possible actions, $\tau$ represents a probability of an action taken from a state at a certain time step, r represents a reward for an action and $\gamma$ represents a discount factor, defining an importance of long term rewards. The intelligent agent 112 is in a single state, or alignment $S_t$ at a certain time step t, and actions $a_t$ in every direction along each degree of freedom are rewarded, depending on the effectiveness (e.g., better or worse alignment) of the respective action $a_t$. The training process is arranged so that the intelligent agent 112 may learn a policy $\pi$ that may predict the optimal action with the highest reward from the current state $S_t$:

$$a_t = \pi(S_t)$$

to maximize the long term reward:

$$\sum_{t=0}^{\infty} \gamma^t r_{a_t}$$

where $r_{a_t}$ is the reward for action $a_t$.

The intelligent agent 112 may be modelled by an artificial neural network and, by training the artificial neural network, the policy $\pi$ is stored in the neural network. Once the intelligent agent 112 is trained, and the policy $\pi$ is stored in the neural network, the policy $\pi$ may be implemented by the intelligent agent 112 in an operation setting.

Figure 6:
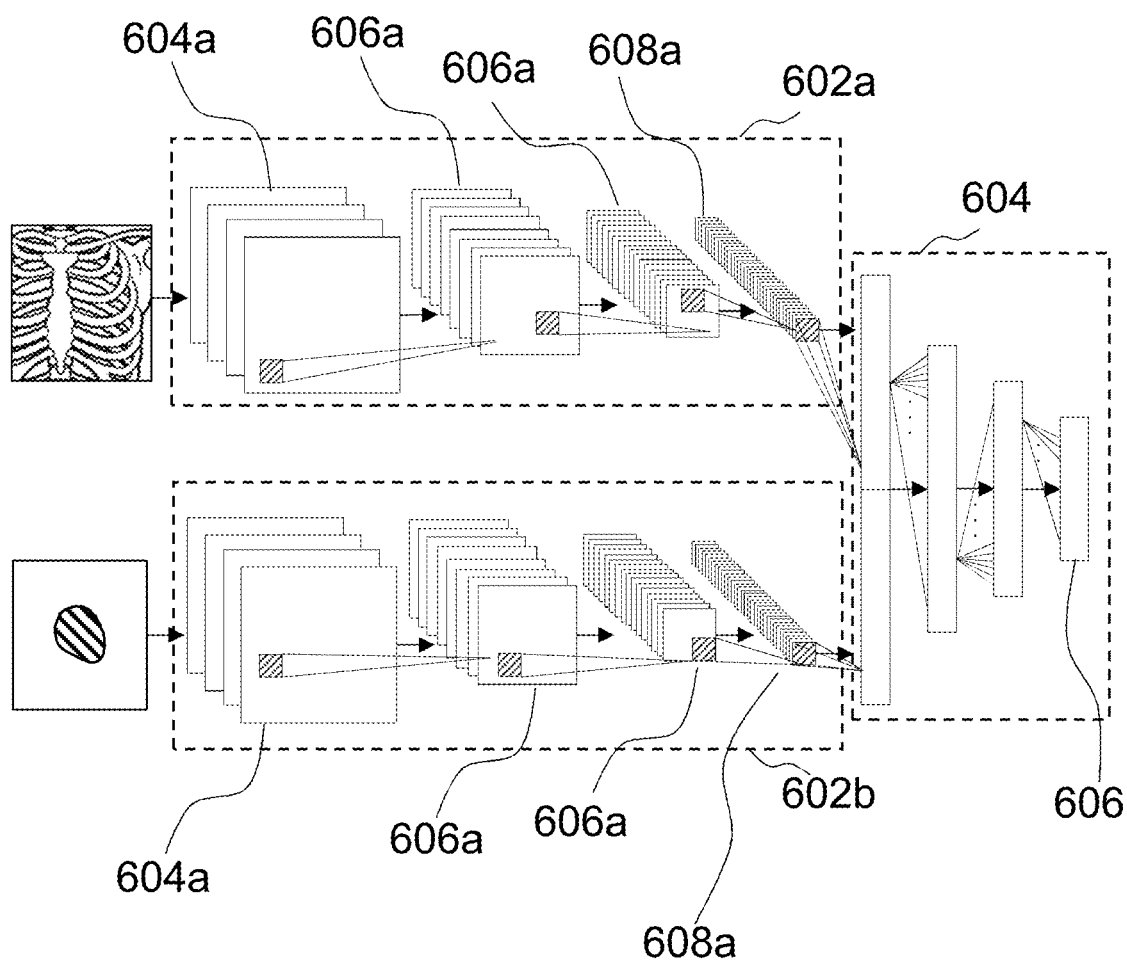
FIG. 6 is a simplified diagram illustrating an example of an architecture of a neural network for storing a policy learned by an intelligent agent.

As shown in FIG. 6, the intelligent agent 112 is modelled by a pair of convolution neural networks 602a, 602b to encode the input images, e.g., the binary masks of the mesh models and the digitally reconstructed radiographs, extracted from the computed tomography data. A further neural network 604 decodes the structures to determine the rewards 606. In some examples, the input images may each be resampled to be the same resolution. For example, each input image may have a 128×128 pixel resolution.

Each of the convolutional neural networks 602a, 602b may include 4 convolution layers 604a, 604b. The convolutional layers 604a, 604b are a set of low-level, shift-invariant filter functions that are learned during training of the intelligent agent 112. Each of the convolutional layers 604a, 604b is followed by rectified linear unit layers 606a, 606b and a pooling layer 608a, 608b. The rectified linear unit layers 606a, 606b set negative inputs from the convolutional layers 604a, 604b to 0 and retain positive responses from the convolutional layers 604a, 604b. The pooling layers 608a, 608b accumulate inputs from the rectified linear unit layers 606a, 606b to a single output.

FIG. 7 is a flow diagram depicting a method 700 of performing a training process to train the intelligent agent 112.

At block 702, training data is provided to the intelligent agent 112. The training data includes three-dimensional image data, as described above.

At block 704, the training data is processed to extract a three-dimensional model of a structure from the training data and to generate digitally reconstructed two-dimensional image data.

At block 706, a two-dimensional projection of the extracted three-dimensional model is generated.

At block 708, the intelligent agent 112, determines a reward for each of a plurality of actions applicable to the two-dimensional projection. The rewards may be defined as described above with reference to FIG. 5.

At block 710, the intelligent agent 112 selects an action based on the determined rewards. For example, the intelligent agent 112 may evaluate each of the rewards associated with each of the plurality of actions and determine which action has the highest associated reward. The intelligent agent 112 may thus determine that the action having the highest associated reward is the action most likely to move the model closer to a transformation to the first target image data. In other words, the intelligent agent 112 may determine that the action having the highest associated reward is the most likely to result in a registration with the target image data. In some examples, the intelligent agent 112 may be provided with an optimal reward in a so-called supervised learning process to increase the efficiency of the training process.

At block 712, the extracted three-dimensional model is transformed according to the selected action. For example, the selected action may be applied to model to generate a transformed model and further projection image data may be generated based on a two-dimensional projection of the transformed model.

At block 714, the intelligent agent 112 determines whether there is convergence. In other words, the intelligent agent 112 may determine whether a difference between an iteration of the method 700 and a previous iteration (e.g., the change brought about by transforming the model according to the selected action) is below a certain threshold. If the intelligent agent 112 determines that there is not convergence, the method 700 returns to block 706 and projection image data is regenerated based on a two-dimensional projection of a transformed model. If the intelligent agent 112 determines that there is convergence, the intelligent agent 112 moves to block 716 where the method 700 ends.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of determining a transformation between coordinate frames of sets of image data, the method comprising:
receiving a model of a structure extracted from first source image data, the first source image data being generated according to a first imaging modality and having a first data format, wherein the model has a second data format, different from the first data format;
determining, using an intelligent agent, a transformation between coordinate frames of the model and first target image data, the first target image data being generated according to a second imaging modality different from the first imaging modality;
generating projection image data based on a two-dimensional projection of the model;
determining, by the intelligent agent, a reward for each of a plurality of actions applicable to the projection image data;
selecting an action based on the determined rewards; and
transforming the projection image data according to the selected action.

2. The method of claim 1, further comprising:
receiving a further model of a structure extracted from second source image data, the second source image data being generated according to a third imaging modality, different from the first modality, and having a third data format different from the first data format, wherein the further model has the second data format; and
determining, using the intelligent agent, a transformation between coordinate frames of the further model and second target image data, the second target image data being generated according to a fourth imaging modality different from the first imaging modality.

3. The method of claim 1, further comprising:
segmenting the first source image data to extract the model.

4. The method of claim 3, further comprising:
generating a polygon mesh based on the segmented first source image data.

5. The method of claim 1, wherein the first source image data comprises three-dimensional image data and the first target image data comprises two-dimensional image data.

6. The method of claim 1, wherein the transforming of the projection image data comprises:
applying the selected action to the model to generate a transformed model; and
generating further projection image data based on a two-dimensional projection of the transformed model.

7. The method of claim 1, wherein the reward for each action of the plurality of actions is determined based on a translation of the projection image data, a rotation of the projection image data, or a combination thereof.

8. The method of claim 1, further comprising:
specifying imaging geometry associated with the first target image data; and
generating the projection image data in accordance with the specified imaging geometry.

9. The method of claim 1, wherein the first source image data comprises one of: magnetic resonance image data, computed tomography image data, and ultrasound image data, or
wherein the first target image data comprises X-ray image data.

10. The method of claim 1, further comprising:
performing a training process to train the intelligent agent, the training process comprising:
providing training data to the intelligent agent, the training data comprising three-dimensional image data;
processing the training data to extract a three-dimensional model of a structure from the training data and to generate digitally reconstructed two-dimensional image data;
generating a two-dimensional projection of the extracted three-dimensional model;
determining, by the intelligent agent, a reward for each of a plurality of actions applicable to the two-dimensional projection;
selecting an action based on the determined rewards; and
transforming the extracted three-dimensional model according to the selected action.

11. The method of claim 10, wherein the two-dimensional projection has a field of view that is smaller than a field of view of the digitally reconstructed two-dimensional image data.

12. The method of claim 10, wherein the training data comprises computed tomography image data.

13. A medical imaging device comprising:
a processor configured to:
receive a model of a structure extracted from first source image data, the first source image data being generated according to a first imaging modality and having a first data format, wherein the model has a second data format, different from the first data format;
determine, using an intelligent agent, a transformation between coordinate frames of the model and first target image data, the first target image data being generated according to a second imaging modality different from the first imaging modality;
generate projection image data based on a two-dimensional projection of the model;
determine a reward for each of a plurality of actions applicable to the projection image data;
select an action based on the determined rewards; and
transform the projection image data according to the selected action.

14. The medical imaging device of claim 13, further comprising:
a display unit,
wherein the processor is configured to:
generate an overlay based on the transformation between coordinate frames of the model and the first target image data;
apply the overlay to the target image data to generate an annotated image; and
display the annotated image on the display unit.

15. A non-transitory computer program product comprising a computer program, the computer program being loadable into a memory unit of a data processing system, the computer program comprising program code sections, that when executed by a processor of the data processing system, cause the data processing system to:
receive a model of a structure extracted from first source image data, the first source image data being generated according to a first imaging modality and having a first data format, wherein the model has a second data format, different from the first data format;
determine a transformation between coordinate frames of the model and first target image data, the first target image data being generated according to a second imaging modality different from the first imaging modality;
generate projection image data based on a two-dimensional projection of the model;
determine a reward for each of a plurality of actions applicable to the projection image data;
select an action based on the determined rewards; and
transform the projection image data according to the selected action.

* * * * *